United States Patent
Palally et al.

(10) Patent No.: US 12,213,092 B2
(45) Date of Patent: Jan. 28, 2025

(54) HIGH RESOLUTION TIMING ADVANCE ESTIMATION BASED ON PRACH

(71) Applicant: Parallel Wireless, Inc., Nashua, NH (US)

(72) Inventors: Hemanth Palally, Bangalore (IN); Saikat Senapati, Bangalore (IN); Somasekhar Pemmasani, Bangalore (IN)

(73) Assignee: Parallel Wireless, Inc., Nashua, NH (US)

(*) Notice: Subject to any disclaimer, the term of this patent is extended or adjusted under 35 U.S.C. 154(b) by 37 days.

(21) Appl. No.: 17/494,335

(22) Filed: Oct. 5, 2021

(65) Prior Publication Data

US 2022/0030535 A1    Jan. 27, 2022

Related U.S. Application Data (62) Division of application No. 16/576,369, filed on Sep. 19, 2019, now Pat. No. 11,140,647.

(60) Provisional application No. 62/733,446, filed on Sep. 19, 2018.

(51) Int. Cl.
| | |
|---|---|
| *H04W 56/00* | (2009.01) |
| *H04L 27/26* | (2006.01) |
| *H04W 74/0833* | (2024.01) |

(52) U.S. Cl.
CPC ..... *H04W 56/0045* (2013.01); *H04L 27/2636* (2013.01); *H04W 74/0833* (2013.01)

(58) Field of Classification Search
CPC .......... H04W 56/0045; H04W 74/0833; H04L 27/2636; H04L 27/2672; H04L 27/2675; H04L 27/2646; H04L 27/2663
USPC .......................................................... 370/329
See application file for complete search history.

(56) References Cited

U.S. PATENT DOCUMENTS

| | | | | |
|---|---|---|---|---|
| 2019/0342845 A1* | 11/2019 | Laselva | .............. | H04B 7/18504 |
| 2020/0154387 A1* | 5/2020 | Yu | ....................... | H04L 27/2675 |

\* cited by examiner

*Primary Examiner* — Mang Hang Yeung
(74) *Attorney, Agent, or Firm* — Michael Y. Saji (57) ABSTRACT

Systems, methods and computer software are disclosed for providing high resolution timing advance estimation based on Physical Random Access Channel (PRACH). An example method includes receiving a preamble signal r(n) having a predetermined sampling frequency and a predetermined length; correlating a down sampled version of the received preamble with a reference preamble sequence c(n) using an FFT method to provide correlation output Ryc; using a peak value P of the correlation output Ryc to detect a preamble ID and a timing advance at a resolution of 24Ts; zero padding sequences Y(k) and C(k) so that they have a predetermined length resulting in sequences Y_hat(k) and C_hat(k), which are 1024-point FFT of y(n) and c(n); performing a maximum likelihood estimation (MLE) to estimate a timing offset; and detecting a peak value out of the R_hat(m) and using a corresponding index Q to provide a timing advance with an accuracy of 2Ts.

6 Claims, 9 Drawing Sheets

PRIOR ART
FIG. 1A

PRIOR ART

FIG. 1B

PRIOR ART

HIGH RESOLUTION TIMING ADVANCE ESTIMATION BASED ON PRACH

CROSS-REFERENCE TO RELATED APPLICATIONS

This application is a divisional application of, and claims the benefit under 35 U.S.C. § 120 of, U.S. patent application Ser. No. 16/576,369, filed Sep. 19, 2019 and entitled "HIGH RESOLUTION TIMING ADVANCE ESTIMATION BASED ON PRACH," which itself claims the benefit of priority under 35 U.S.C. § 119(e) of U.S. Provisional Pat. App. No. 62/773,446, filed Sep. 19, 2018, titled "High Resolution Timing Advance Estimation Based on PRACH" which is hereby incorporated by reference in its entirety for all purposes. This application also hereby incorporates by reference U.S. patent application Ser. No. 15/241,060, entitled "Cell ID Disambiguation" and filed Aug. 18, 2016, which itself is a non-provisional conversion of, and claims the benefit of priority under 35 U.S.C. § 119(e) to U.S. Provisional Pat. App. No. 62/206,666, filed Aug. 18, 2015 with title "Cell ID Disambiguation," each hereby incorporated by reference in its entirety. As well, U.S. Pat. No. 8,867,418 and U.S. Pat. App. No. 20140133456 are also hereby incorporated by reference in their entireties. The present application hereby incorporates by reference U.S. Pat. App. Pub. Nos. US20110044285, US20140241316; WO Pat. App. Pub. No. WO2013145592A1; EP Pat. App. Pub. No. EP2773151A1; U.S. Pat. No. 8,879,416, "Heterogeneous Mesh Network and Multi-RAT Node Used Therein," filed May 8, 2013; U.S. Pat. No. 8,867,418, "Methods of Incorporating an Ad Hoc Cellular Network Into a Fixed Cellular Network," filed Feb. 18, 2014; U.S. patent application Ser. No. 14/777,246, "Methods of Enabling Base Station Functionality in a User Equipment," filed Sep. 15, 2016; U.S. patent application Ser. No. 14/289,821, "Method of Connecting Security Gateway to Mesh Network," filed May 29, 2014; U.S. patent application Ser. No. 14/642,544, "Federated X2 Gateway," filed Mar. 9, 2015; U.S. patent application Ser. No. 14/711,293, "Multi-Egress Backhaul," filed May 13, 2015; U.S. Pat. App. No. 62/375,341, "S2 Proxy for Multi-Architecture Virtualization," filed Aug. 15, 2016; U.S. patent application Ser. No. 15/132,229, "Max-Mesh: Mesh Backhaul Routing," filed Apr. 18, 2016, each in its entirety for all purposes. This application also hereby incorporates by reference in their entirety each of the following U.S. Pat. applications or Pat. App. Publications: US20150098387A1 (PWS-71731US01); US20170055186A1 (PWS-71815US01); US20170273134A1 (PWS-71850US01); US20170272330A1 (PWS-71850US02); and Ser. No. 15/713,584 (PWS-71850US03).

This application hereby incorporates by reference, for all purposes, each of the following U.S. Patent Application Publications in their entirety: US20170013513A1; US20170019375A1; US20170026845A1; US20170048710A1; US20170055186A1; US20170064621A1; US20170070436A1; US20170077979A1; US20170111482A1; US20170127409A1. US20170127409A1; US20170171828A1; US20170181119A1; US20170202006A1; US20170208560A1; US20170238278A1; US20170257133A1; US20170272330A1; US20170273134A1; US20170273134A1; US20170288813A1; US20170295510A1; US20170303163A1.

BACKGROUND

The ability both to locate an object and to communicate with it is a combination that enables a wide range of location-based services—from navigator-like map services to location-based advertising to tracking children, cars or even convicted criminals. This provides a natural motivation for mobile phones to have positioning capabilities. Another strong motivation is a requirement from the Federal Communications Commission (FCC) of the USA that emergency calls, whether fixed or mobile, can be located with a high degree of accuracy.

The first version of LTE (Release 8) does not provide any direct protocol support for locating the User Equipment (UE). However, a Release 8 LTE UE can nonetheless be located by means of Assisted Global Navigation Satellite System (A-GNSS) and Enhanced Cell-ID-based techniques in conjunction with a general-purpose positioning protocol known as Secure User Plane Location (SUPL), defined by the Open Mobile Alliance (OMA). SUPL operates as a service in the application layer and requires only a normal User Plane (UP) connection between a server in the network (known in OMA as a SUPL Location Platform (SLP) and in LTE as an Evolved Serving Mobile Location Centre (E-SMLC)) and the SUPL client application in the UE.

Timing advance corresponds to the length of time a signal takes to reach the base station from a mobile phone. This length of time can be used to determine the distance to the mobile phone. The basic timing unit for LTE, represented by $T_S$, is 1/30720000 seconds, the basis of which is the sampling rate for 2048 FFT size implementation of OFDM for subcarrier spacing of $\Delta f$=15 kHz (i.e., $T_S=1/(\Delta f_{ref} \cdot N_{f,ref})$, with subcarrier spacing of 15 kHz). The basic timing unit for 5G NR is represented by $T_C$ and $T_C=1/(\Delta f_{max} \cdot N_f)$, where $\Delta f_{max}$ is the subcarrier spacing and $N_f$ is the FFT size.

SUMMARY

Systems and methods are disclosed for estimating Timing Advance in a cellular network with resolution of 2Ts based on Physical Random-Access Channel (PRACH), the channel used by the UE in the uplink direction to get initial access and to synchronize with the network. As part of this synchronization process, eNodeB must estimate the Timing Advance to be used by the UE to ensure all its transmissions are aligned with frame boundaries. A typical requirement for the accuracy of TA as defined by the 3GPP standard is 16Ts. However, some networks have the need to estimate TA with a much higher resolution. LPPa protocol is used in LTE networks for finding UE position for emergency services. This protocol expects Physical layer to report the timing advance (TA) with higher resolution of 2Ts.

In one embodiment, a method may be disclosed for providing high resolution timing advance estimation based on Physical Random Access Channel (PRACH). The method includes receiving a preamble signal r(n) having a predetermined sampling frequency and a predetermined length; correlating a downsampled version of the received preamble with a reference preamble sequence c(n) using an FFT method to provide correlation output Ryc; and using a peak value P of the correlation output Ryc to detect a preamble ID and a timing advance at a resolution of 24Ts. The method also includes zero padding sequences Y(k) and C(k) so that they have a predetermined length resulting in sequences Y_hat(k) and C_hat(k), wherein Y(k) and C(k) are 1024-point FFT of y(n) and c(n); performing a maximum likelihood estimation (MLE) to estimate a timing offset; and detecting a peak value out of the R_hat(m) and using a corresponding index Q to provide a timing advance with an accuracy of 2Ts.

In another embodiment, a non-transitory computer-readable medium containing instructions for providing high resolution timing advance estimation based on Physical Random Access Channel (PRACH) is disclosed. The non-transitory computer-readable medium instructions, when executed, cause a processing device to perform steps including receiving a preamble signal r(n) having a predetermined sampling frequency and a predetermined length; correlating a down sampled version of the received preamble with a reference preamble sequence c(n) using an FFT method to provide correlation output Ryc; and using a peak value P of the correlation output Ryc to detect a preamble ID and a timing advance at a resolution of 24Ts. The non-transitory computer-readable medium further includes instructions, when executed, cause a processing device to perform steps zero padding sequences Y(k) and C(k) so that they have a predetermined length resulting in sequences Y_hat(k) and C_hat(k), wherein Y(k) and C(k) are 1024-point FFT of y(n) and c(n); performing a maximum likelihood estimation (MLE) to estimate a timing offset; and detecting a peak value out of the R_hat(m) and using a corresponding index Q to provide a timing advance with an accuracy of 2Ts.

In another embodiment, a system for providing high resolution timing advance estimation based on Physical Random Access Channel (PRACH) is disclosed. The system includes a processing device which performs steps comprising: receiving a preamble signal r(n) having a predetermined sampling frequency and a predetermined length; correlating a down sampled version of the received preamble with a reference preamble sequence c(n) using an FFT method to provide correlation output Ryc; and using a peak value P of the correlation output Ryc to detect a preamble ID and a timing advance at a resolution of 24Ts. The system further performs steps including performing zero padding sequences Y(k) and C(k) so that they have a predetermined length resulting in sequences Y_hat(k) and C_hat(k), wherein Y(k) and C(k) are 1024-point FFT of y(n) and c(n); performing a maximum likelihood estimation (MLE) to estimate a timing offset; and detecting a peak value out of the R_hat(m) and using a corresponding index Q to provide a timing advance with an accuracy of 2Ts.

In another embodiment, a method may be disclosed, comprising: receiving a preamble y(n) from a user equipment in a frequency domain; performing a Fourier transform on the received preamble y(n) to generate a received time-domain preamble y(k); performing a Fourier transform on a reference preamble c(n) to generate a time-domain reference preamble c(k); performing an inverse Fourier transform on a dot product of the received time-domain preamble y(k) and the reference time-domain preamble c(k) to generate a correlation function R; padding the received time-domain preamble y(k) and the reference time-domain preamble c(k) to a certain length with zeroes; using a peak value P of the correlation function R to detect a preamble identifier; performing an inverse discrete Fourier transform on the dot product of the received time-domain preamble y(k) and the reference time-domain preamble c(k) at a plurality of positions within a sparse timing hypothesis window L, the sparse timing hypothesis window L based on the preamble identifier, to generate a second correlation function R_hat; and using a peak value Q of the second correlation function R_hat to determine a timing advance value.

The preamble may be a preamble of a Long Term Evolution (LTE) or 5G Physical Random Access Channel (PRACH) radio signal, and The method may further comprise retrieving a PRACH preamble format table to interpret the preamble identifier. The timing advance value has a resolution of 2Ts or finer. The method may further comprise performing a grouped FFT algorithm for selective transformed outputs to generate the second correlation function R_hat. The method may further comprise performing cyclic prefix removal, frequency shifting, and downsampling on the received preamble. The preamble may be a portion of a orthogonal frequency division multiplexed (OFDM) signal. The method may further comprise retrieving the reference preamble or the reference time-domain preamble from a storage medium.

DETAILED DESCRIPTION

We are looking for Positioning based on Cell-ID (CID) which uses geographical knowledge of a UE's serving cell. To improve the accuracy, measurements made by the UE and/or the eNodeB can be utilized in addition.

Basic CID positioning estimates the location of a UE using only the coordinates of its serving eNodeB. Typically, basic CID positioning provides only coarse estimation of the UE location, with accuracy of roughly the same order as the cell radius.

Figure 1A:
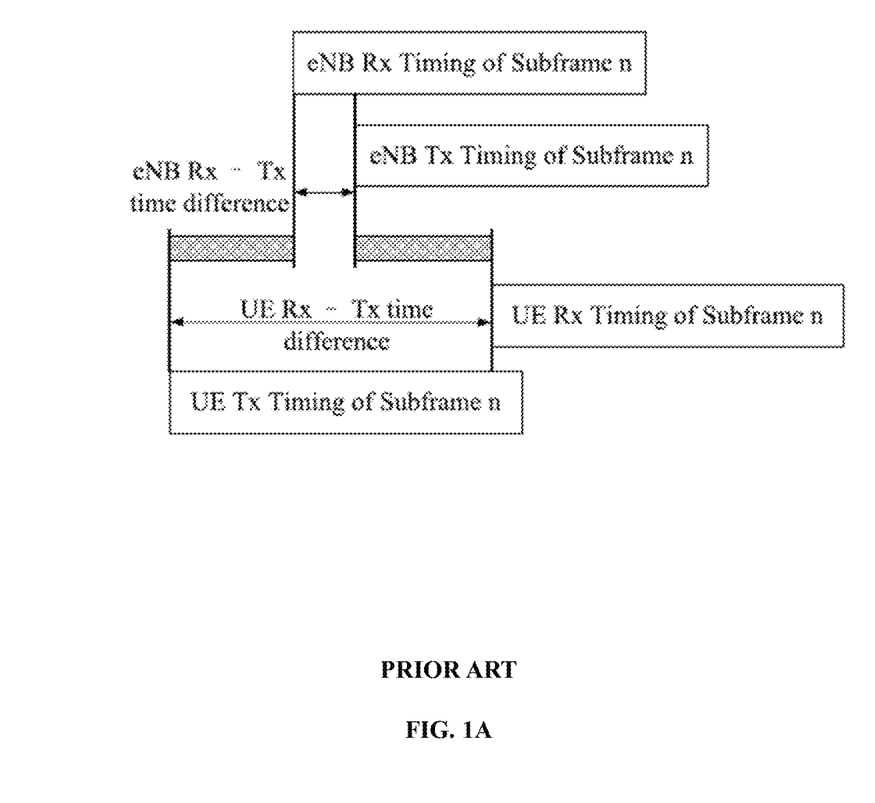
FIG. 1A is a diagram showing type 1 and type 2 timing advance definitions.

Enhanced CID positioning uses additional information beyond the identity of the eNodeB that is serving the UE. The distance of a UE from its serving eNodeB or cell can be estimated from the Round Trip Time (RTT). Two measurements are defined in LTE Release 9 by which an eNodeB can indicate the RTT to the E-SMLC, namely 'Timing Advance Type 1' and 'Timing Advance Type 2'. A diagram of type 1 and type 2 timing advance are shown in FIG. 1A.

Type 1 and type 2 Timing Advance definition is mentioned in 3GPP spec 36.214 section 5.2.4, which is hereby incorporated by reference.

| Definition | Type 1 |
|---|---|
| | Timing advance ($T_{ADV}$) type 1 is defined as the time difference |
| | $T_{ADV}$ = (eNB Rx – Tx time difference) + (UE Rx – Tx time difference). |
| | where the eNB Rx – Tx time difference corresponds to the same UE that reports the UE Rx – Tx time difference. |
| | Type 2: |
| | Timing advance ($T_{ADV}$) type 2 is defined as the time difference |
| | $T_{ADV}$ = (eNB Rx – Tx time difference), |
| | where the eNB Rx – Tx time difference corresponds to a received uplink radio frame containing PRACH from the respective UE |

Figure 2:
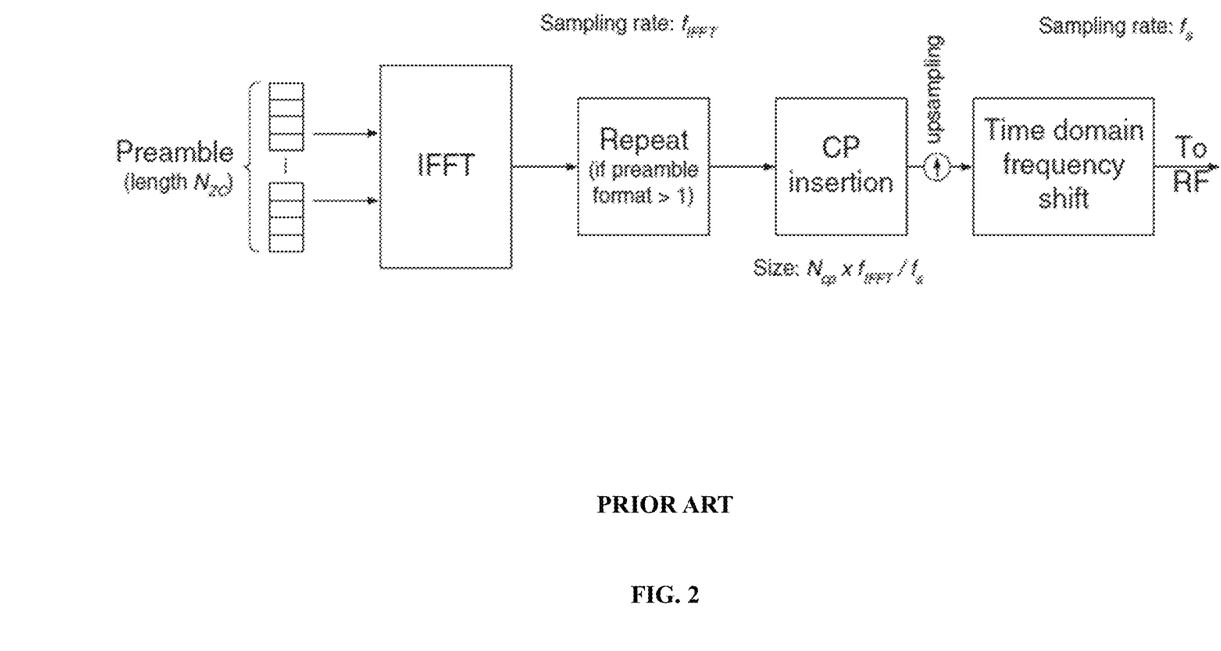
FIG. 2 is a diagram showing processing for conventional timing advance estimation.

Physical Random Access Channel (PRACH) is used to achieve uplink time synchronization for a UE which either has not yet acquired, or has lost, its uplink synchronization. A successful PRACH attempt should allow subsequent UE transmissions to be inserted among the scheduled synchronized transmissions of other UEs. This sets the required timing estimation accuracy which must be achievable from the PRACH decoding at eNB PRACH Transmitter Most convenient implementation of PRACH transmitter in the UE is to generate the preamble using smallest possible IFFT and shifting the preamble to the required frequency location through time-domain up sampling and filtering (commonly known as hybrid frequency/time domain PRACH generation shown in the FIG. 2). Given that the preamble sequence based on Zadoff-Chu of length is 839, the smallest IFFT size that can be used is 1024, resulting in a sampling frequency of 1.28 Msps. Both the CP and sequence durations have been designed to provide an integer number of samples at this sampling rate. The CP can be inserted before the up sampling and time-domain frequency Shift.

Figure 1B:
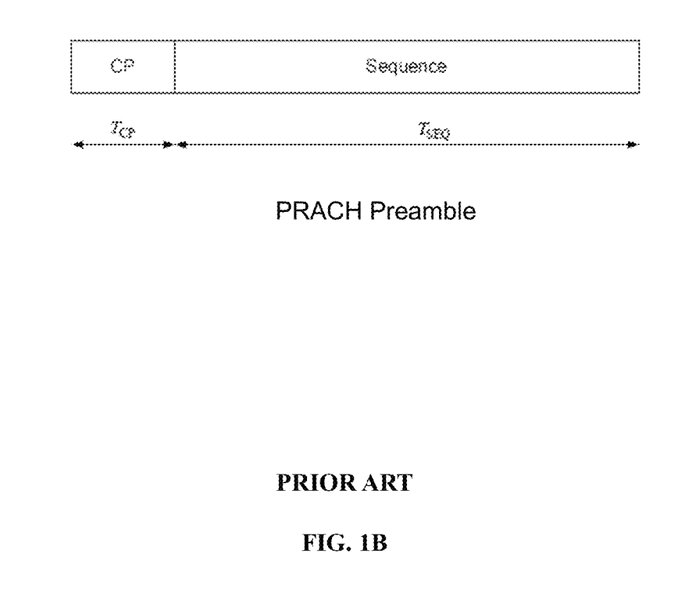
FIG. 1B is a diagram showing a PRACH preamble structure.

A PRACH Preamble structure is shown in FIG. 1B.

PRACH Formats

| Preamble format | $T_{CP}$ | $T_{SEQ}$ |
|---|---|---|
| 0 | 3168 · $T_s$ | 24576 · $T_s$ |
| 1 | 21024 · $T_s$ | 24576 · $T_s$ |
| 2 | 6240 · $T_s$ | 2 · 24576 · $T_s$ |
| 3 | 21024 · $T_s$ | 2 · 24576 · $T_s$ |
| 4* | 448 · $T_s$ | 4096 · $T_s$ |

As described above Type 2 Measurement report of LPPa protocol requires 2Ts/8Ts resolution timing advance to better locate UE positioning. Physical layer is responsible for decoding PRACH Preamble and its corresponding Timing Advance (TA) and report to higher layers. Traditional measurement report gets 16 Ts timing resolution from Physical layer (PHY) which boils down to approx. 80 meters range of UE positioning. As part of LPPa requirement, PHY is required to report Timing Advance with higher accuracy of 2Ts. This 2Ts resolution will give UE positioning accuracy up to 10 meters.

Solution to Problem

The current implementation of the PRACH detector estimates the timing advance with the accuracy of 16 Ts. The proposed method works in tandem with the existing implementation to estimate the TA with higher resolution of 2Ts. A key insight is that the timing offset can be determined from the correlation of the received PRACH preamble with the reference received preamble. In other words, the transmitted preamble is known to be an interpolated or upsampled version of the original short preamble sequence.

Figure 3:
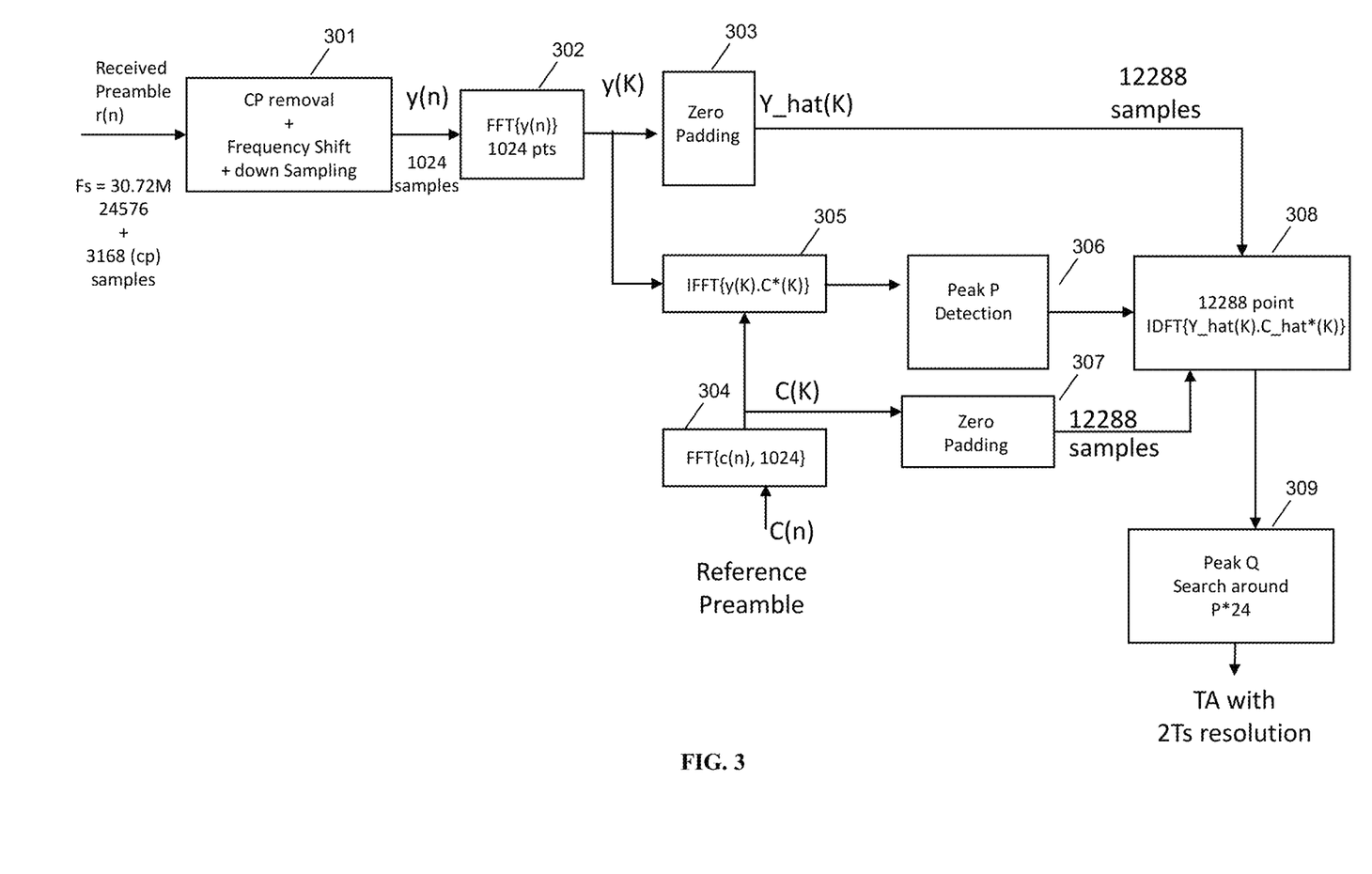
FIG. 3 is a diagram showing processing for timing advance estimation, in accordance with some embodiments.

The processing steps required in the method are as follows, and are shown in FIG. 3.

The received preamble signal r(n) has the sampling frequency of 30.72 Msps and is 24576 samples long. It must be conditioned before passing to the PRACH detector. The signal conditioning includes following operations:

At 301, Cyclic prefix is removed, and only Preamble sequence is extracted;

The positioning of the signal in the frequency domain is determined by the factor n_PRB_Offset. The signal is shifted in frequency by n_PRB_Offset so that it is centered about DC;

Anti-aliasing filter followed by down sampling by a factor of 24. So, the preamble sequence length reduces to 1024 samples. The resulting sequence is y(n);

At 302, a 1024-point FFT of y(n) is calculated, outputting y(k);

At 303, the output y(k) is padded with zeroes to become Y_hat(k), which is 12288 samples long;

Separately, at 304, a reference preamble c(n) is input to a 1024-point FFT, outputting c(k);

At 305, the down sampled version of the received preamble is correlated with the reference preamble sequence c(n) using the FFT method, Ryc=ifft{Y(k).C*(k)}, where Y(k) and C(k) are 1024-point FFT of y(n) and c(n) respectively;

At 306, the peak value P of the correlation output Ryc is used to detect the preamble ID and the Timing advance at a resolution of 24Ts;

At 307, the sequence C(k) is zero padded so that its length becomes 12288. Let the resulting sequence be C_hat(k);

At 308, a maximum likelihood estimation (MLE) is performed to estimate the timing offset. The MLE method is based on the correlation of the received preamble at Fs=30.72 Msps with the reference received preamble that is also at the same sampling rate. We perform 12288 point circular correlation at multiple positions in a timing hypothesis window L, e.g., compute the selective IDFT transformed outputs of R_hat(m)=IDFT{Y_hat(k).C_hat*(k)};

The values of m are determined by the value P:

$$(P*12-L/2) \leq m \leq (P*12+L/2)$$

To reduce the complexity involved in the computation of R_hat(m), we avoid using conventional IFFT. Instead we use 'Grouped FFT algorithm for selective transformed outputs' (see the paper of the same title by CP Fan, GA Su—APCCAS 2006-2006 IEEE Asia Pacific . . . , 2006—ieeexplore.ieee.org). This algorithm exploits the periodicity and symmetricity properties of DFT twiddle factor to compute IDFT only at selective indices m within the window L. In other words, we exploit the fact that the transmitted LTE preamble is the interpolated or upsampled version of the original short preamble sequence. In other words, the frequency components of the preamble is bounded to a narrow bandwidth of 1.4 KHz.

Figure 4:
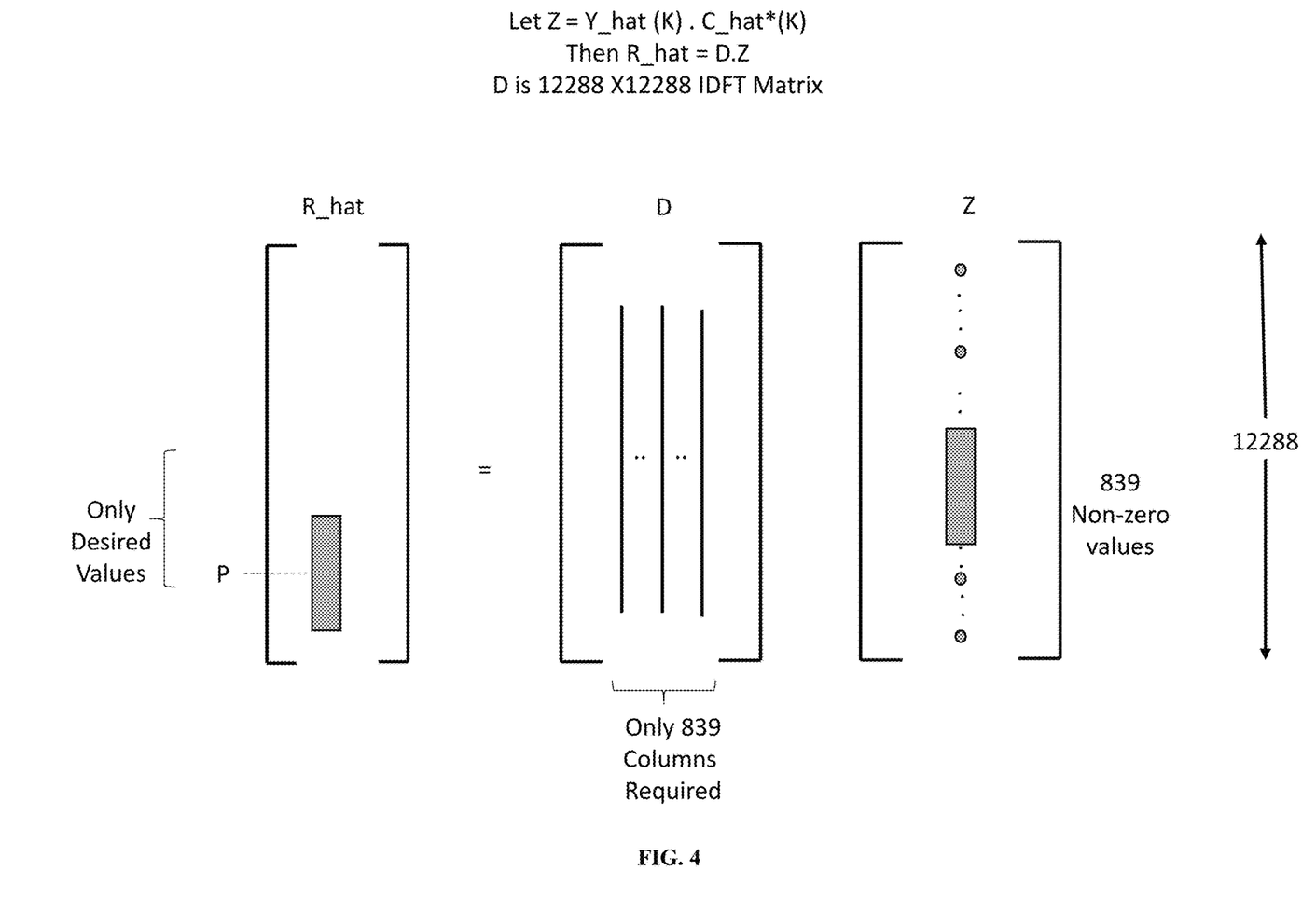
FIG. 4 is a diagram showing processing of only desired values, in accordance with some embodiments.

Further reduction in computation is achieved using the sparsity of the IDFT inputs (depicted in FIG. 4). Only 839 out of 12288 input samples are non-zeros. So, by keeping track of the input indices in the computations, unnecessary zero multiplications and additions are avoided.

Figure 5:
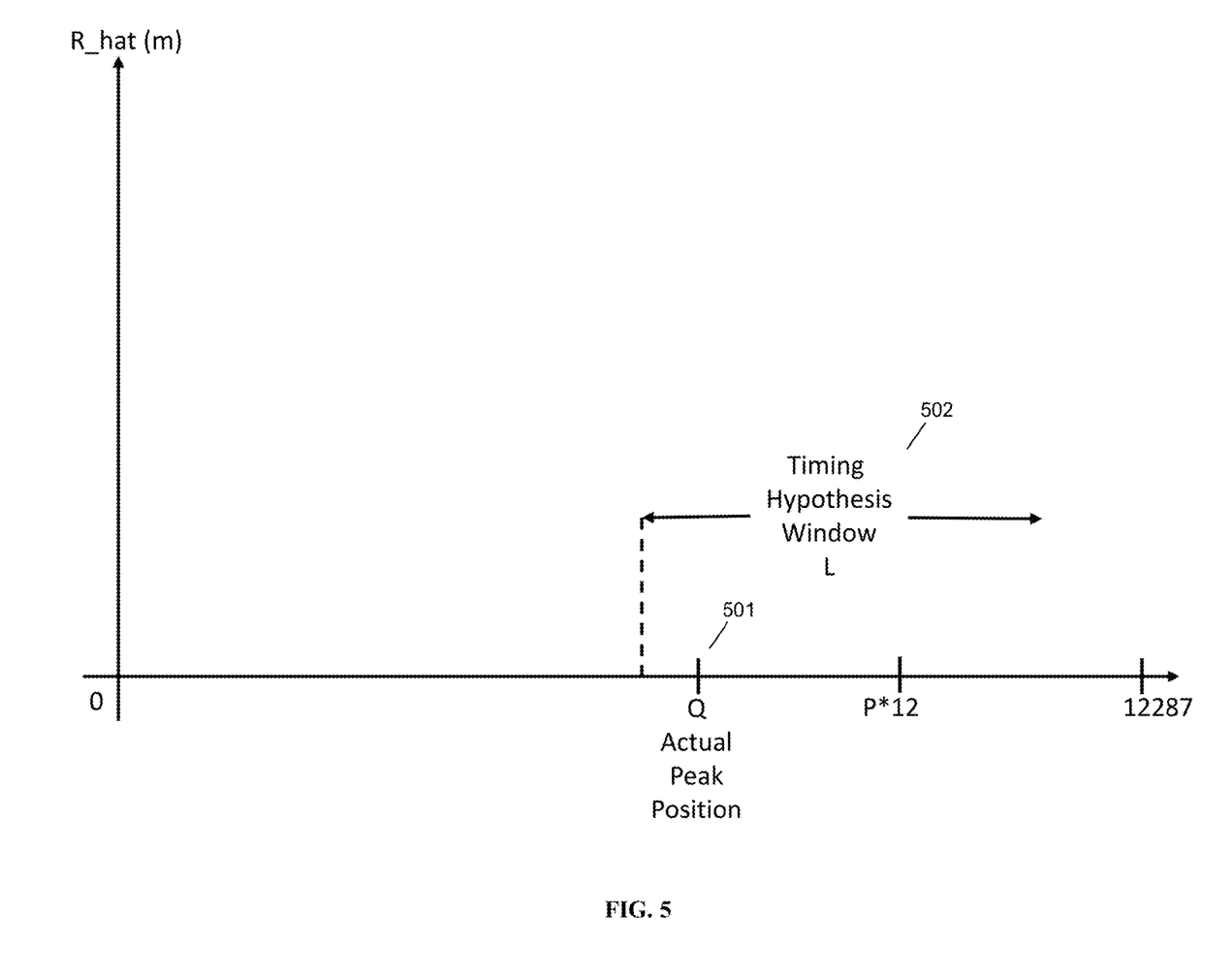
FIG. 5 is a graph showing timing advance with an accuracy of 2Ts, in accordance with some embodiments.

At 309, the peak value out of the R_hat(m) is detected and the corresponding index Q 501 that falls within timing hypothesis window L 502 will provide the timing advance with an accuracy of 2Ts, as shown in FIG. 5.

In various embodiments, this method can be designed to be performed at the base station or could be performed anywhere where sufficient processing power is available, including at a baseband unit colocated or remotely located relative to the base station. No modification is required to the UE.

It is noted that the PRACH preamble structure used in 5G NR (New Radio) is exactly the same as that used in 4G, so the methods disclosed herein could be used by one having skill in the art at a 5G base station or in a 5G network. It is noted that different PRACH preamble structures could be standardized and used, and, when used in combination with the presently disclosed methods and new RF technologies, could provide UE positioning with greater resolution than 2Ts.

The timing advance values derived using the presently described methods could be used, in some embodiments, for UE location/positioning; responding to UE paging requests; reporting UE location to the core network; plotting UE location on a map; using UE location for compliance with governmental requirements for location services and/or emergency services; optimizing beamforming for MIMO applications; optimizing UE location for purposes of assessing handover and inter-cell interference coordination (ICIC), etc. The timing advance values derived using the presently described methods could, in the case of a UE that is a smart watch or smart fob or smart tag, be used to locate the UE within a small radius.

Figure 6:
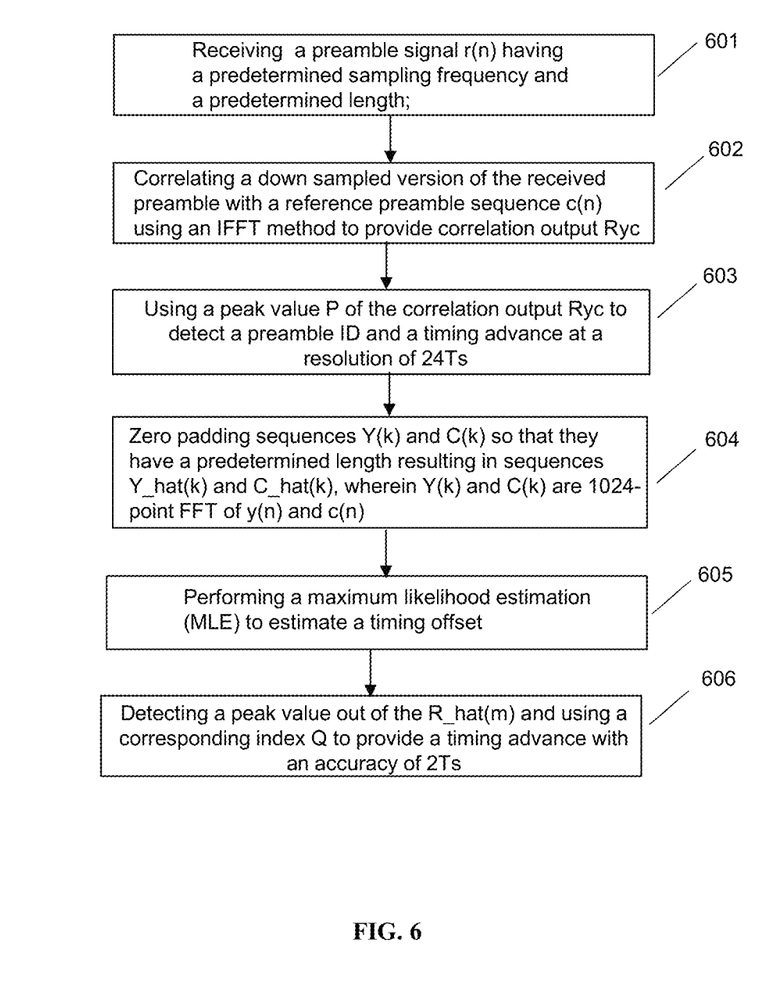
FIG. 6 is a flow diagram for one embodiment of a method for high resolution timing advance estimation based on PRACH, in accordance with some embodiments.

FIG. 6 is a flow diagram of a first embodiment of a method for providing high resolution timing advance estimation based on Physical Random Access Channel (PRACH). The method includes receiving a preamble signal r(n) having a predetermined sampling frequency and a predetermined length (601); correlating a down sampled version of the received preamble with a reference preamble sequence c(n) using an IFFT method to provide correlation output Ryc (602); using a peak value P of the correlation output Ryc to detect a preamble ID and a timing advance at a resolution of 24Ts (603); zero padding sequences Y(k) and C(k) so that they have a predetermined length resulting in sequences Y_hat(k) and C_hat(k), wherein Y(k) and C(k) are 1024-point FFT of y(n) and c(n) (604); performing a maximum likelihood estimation (MLE) to estimate a timing offset (605); and detecting a peak value out of the R_hat(m) and using a corresponding index Q to provide a timing advance with an accuracy of 2Ts (606).

Figure 7:
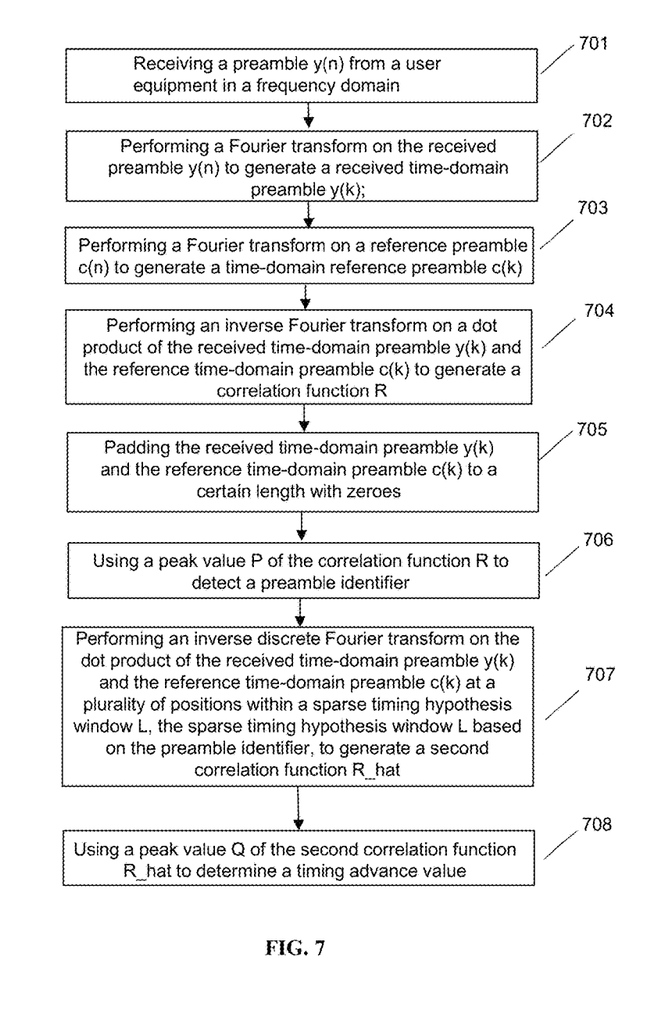
FIG. 7 is a flow diagram for another embodiment of a method for high resolution timing advance estimation based on PRACH, in accordance with some embodiments.

FIG. 7 is a flow diagram of another embodiment of a method for providing high resolution timing advance estimation based on Physical Random Access Channel (PRACH). The method includes receiving a preamble y(n) from a user equipment in a frequency domain (701); performing a Fourier transform on the received preamble y(n) to generate a received time-domain preamble y(k) (702); performing a Fourier transform on a reference preamble c(n) to generate a time-domain reference preamble c(k) (703); performing an inverse Fourier transform on a dot product of the received time-domain preamble y(k) and the reference time-domain preamble c(k) to generate a correlation function R (704); padding the received time-domain preamble y(k) and the reference time-domain preamble c(k) to a certain length with zeroes (705); using a peak value P of the correlation function R to detect a preamble identifier (706); performing an inverse discrete Fourier transform on the dot product of the received time-domain preamble y(k) and the reference time-domain preamble c(k) at a plurality of positions within a sparse timing hypothesis window L, the sparse timing hypothesis window L based on the preamble identifier, to generate a second correlation function R_hat (707); and using a peak value Q of the second correlation function R_hat to determine a timing advance value (708). These steps could be performed in various orders as would be understood by one having skill in the art, e.g., 702 and 703 could be performed with either one being first, or both of them concurrently.

Figure 8:
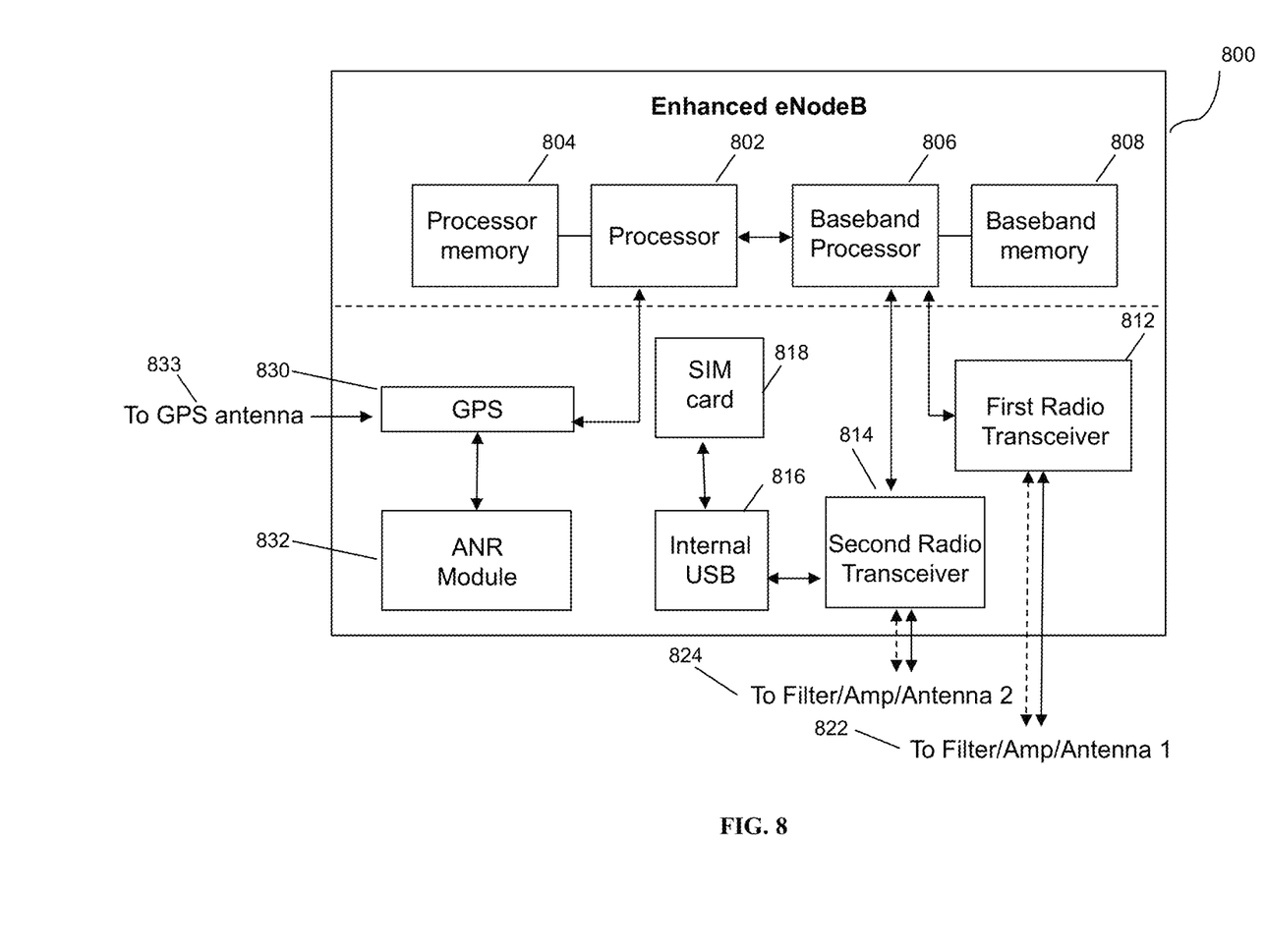
FIG. 8 is an enhanced eNodeB for performing the methods described herein, in accordance with some embodiments.

FIG. 8 is an enhanced eNodeB for performing the methods described herein, in accordance with some embodiments. Mesh network node 800 may include processor 802, processor memory 804 in communication with the processor, baseband processor 806, and baseband processor memory 808 in communication with the baseband processor. Mesh network node 800 may also include first radio transceiver 812 and second radio transceiver 814, internal universal serial bus (USB) port 816, and subscriber information module card (SIM card) 818 coupled to USB port 816. In some embodiments, the second radio transceiver 814 itself may be coupled to USB port 816, and communications from the baseband processor may be passed through USB port 816. The second radio transceiver may be used for wirelessly backhauling eNodeB 800.

Processor 802 and baseband processor 806 are in communication with one another. Processor 802 may perform routing functions, and may determine if/when a switch in network configuration is needed. Baseband processor 806 may generate and receive radio signals for both radio transceivers 812 and 814, based on instructions from processor 802. The steps described herein could be performed at the baseband processor 806, or, in some embodiments, at processor 802. In some embodiments, processors 802 and 806 may be on the same physical logic board. In other embodiments, they may be on separate logic boards.

Processor 802 may identify the appropriate network configuration, and may perform routing of packets from one network interface to another accordingly. Processor 802 may use memory 804, in particular to store a routing table to be used for routing packets. Baseband processor 806 may perform operations to generate the radio frequency signals for transmission or retransmission by both transceivers 810 and 812. Baseband processor 806 may also perform operations to decode signals received by transceivers 812 and 814. Baseband processor 806 may use memory 808 to perform these tasks.

The first radio transceiver 812 may be a radio transceiver capable of providing LTE eNodeB functionality, and may be capable of higher power and multi-channel OFDMA. The second radio transceiver 814 may be a radio transceiver capable of providing LTE UE functionality. Both transceivers 812 and 814 may be capable of receiving and transmitting on one or more LTE bands. In some embodiments, either or both of transceivers 812 and 814 may be capable of providing both LTE eNodeB and LTE UE functionality. Transceiver 812 may be coupled to processor 802 via a Peripheral Component Interconnect-Express (PCI-E) bus, and/or via a daughtercard. As transceiver 814 is for providing LTE UE functionality, in effect emulating a user equipment, it may be connected via the same or different PCI-E bus, or by a USB bus, and may also be coupled to SIM card 818. First transceiver 812 may be coupled to first radio frequency (RF) chain (filter, amplifier, antenna) 822, and second transceiver 814 may be coupled to second RF chain (filter, amplifier, antenna) 824.

SIM card 818 may provide information required for authenticating the simulated UE to the evolved packet core (EPC). When no access to an operator EPC is available, a local EPC may be used, or another local EPC on the network may be used. This information may be stored within the SIM card, and may include one or more of an international mobile equipment identity (IMEI), international mobile subscriber identity (IMSI), or other parameter needed to identify a UE. Special parameters may also be stored in the SIM card or provided by the processor during processing to identify to a target eNodeB that device 800 is not an ordinary UE but instead is a special UE for providing backhaul to device 800.

Wired backhaul or wireless backhaul may be used. Wired backhaul may be an Ethernet-based backhaul (including Gigabit Ethernet), or a fiber-optic backhaul connection, or a cable-based backhaul connection, in some embodiments. Additionally, wireless backhaul may be provided in addition to wireless transceivers 812 and 814, which may be Wi-Fi 802.11a/b/g/n/ac/ad/ah, Bluetooth, ZigBee, microwave (including line-of-sight microwave), or another wireless backhaul connection. Any of the wired and wireless connections described herein may be used flexibly for either access (providing a network connection to UEs) or backhaul (providing a mesh link or providing a link to a gateway or core network), according to identified network conditions and needs, and may be under the control of processor 802 for reconfiguration.

A GPS module 830 may also be included, and may be in communication with a GPS antenna 832 for providing GPS coordinates, as described herein. When mounted in a vehicle, the GPS antenna may be located on the exterior of the vehicle pointing upward, for receiving signals from overhead without being blocked by the bulk of the vehicle or the skin of the vehicle. Automatic neighbor relations (ANR) module 832 may also be present and may run on processor 802 or on another processor, or may be located within another device, according to the methods and procedures described herein.

Other elements and/or modules may also be included, such as a home eNodeB, a local gateway (LGW), a self-organizing network (SON) module, or another module. Additional radio amplifiers, radio transceivers and/or wired network connections may also be included.

The system may include 5G equipment. 5G networks are digital cellular networks, in which the service area covered by providers is divided into a collection of small geographical areas called cells. Analog signals representing sounds and images are digitized in the phone, converted by an analog to digital converter and transmitted as a stream of bits. All the 5G wireless devices in a cell communicate by radio waves with a local antenna array and low power automated transceiver (transmitter and receiver) in the cell, over frequency channels assigned by the transceiver from a common pool of frequencies, which are reused in geographically separated cells. The local antennas are connected with the telephone network and the Internet by a high bandwidth optical fiber or wireless backhaul connection.

5G uses millimeter waves which have shorter range than microwaves, therefore the cells are limited to smaller size. Millimeter wave antennas are smaller than the large antennas used in previous cellular networks. They are only a few inches (several centimeters) long. Another technique used for increasing the data rate is massive MIMO (multiple-input multiple-output). Each cell will have multiple antennas communicating with the wireless device, received by multiple antennas in the device, thus multiple bitstreams of data will be transmitted simultaneously, in parallel. In a technique called beamforming the base station computer will continuously calculate the best route for radio waves to reach each wireless device, and will organize multiple antennas to work together as phased arrays to create beams of millimeter waves to reach the device.

The foregoing discussion discloses and describes merely exemplary embodiments of the present invention. In some embodiments, software that, when executed, causes a device to perform the methods described herein may be stored on a computer-readable medium such as a computer memory storage device, a hard disk, a flash drive, an optical disc, or the like. As will be understood by those skilled in the art, the present invention may be embodied in other specific forms without departing from the spirit or essential characteristics thereof. Various components in the devices described herein may be added, removed, split across different devices, combined onto a single device, or substituted with those having the same or similar functionality.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Features of one embodiment may be used in another embodiment. Other embodiments are within the following claims.

The invention claimed is:

1. A method for improving a telecommunications system, comprising:
  receiving, at a 4G or 5G capable base station, a preamble $y(n)$ from a user equipment in a frequency domain;
  performing, using a microprocessor at the 4G or 5G capable base station, a Fourier transform on the received preamble $y(n)$ to generate a received time-domain preamble $y(k)$;
  performing, using the microprocessor at the 4G or 5G capable base station, a Fourier transform on a reference preamble $c(n)$ to generate a time-domain reference preamble $c(k)$;
  performing, using the microprocessor at the 4G or 5G capable base station, an inverse Fourier transform on a dot product of the received time-domain preamble $y(k)$ and the reference time-domain preamble $c(k)$ to generate a correlation function R;
  padding the received time-domain preamble $y(k)$ and the reference time-domain preamble $c(k)$ to a certain length with zeroes;
  using a peak value P of the correlation function R to detect a preamble identifier;
  performing, using the microprocessor at the 4G or 5G capable base station, an inverse discrete Fourier transform on the dot product of the received time-domain preamble $y(k)$ and the reference time-domain preamble $c(k)$ at a plurality of positions within a sparse timing hypothesis window L, the sparse timing hypothesis window L based on the preamble identifier, to generate a second correlation function R_hat; and
  using a peak value Q of the second correlation function R_hat to determine a timing advance value,
  wherein the preamble $y(n)$ is a preamble of a Long Term Evolution (LTE) or 5G Physical Random Access Channel (PRACH) radio signal, and further comprising retrieving a PRACH preamble format table to interpret the preamble identifier.

2. The method of claim 1, wherein the timing advance value has a resolution of 2 Ts or finer.

3. The method of claim 1, further comprising performing a grouped FFT algorithm for selective transformed outputs to generate the second correlation function R_hat.

4. The method of claim 1, further comprising performing cyclic prefix removal, frequency shifting, and downsampling on the received preamble.

5. The method of claim 1, wherein the preamble is a portion of a orthogonal frequency division multiplexed (OFDM) signal.

6. The method of claim 1, further comprising retrieving the reference preamble or the reference time-domain preamble from a storage medium.

* * * * *